United States Patent [19]
Huang

[11] Patent Number: 6,079,445
[45] Date of Patent: Jun. 27, 2000

[54] QUICK UNIVERSAL JOINT OF AUTO-SEPARATING TWO-WAY CHECK VALVE

[76] Inventor: I-Chuan Huang, 5F-2, No.400, Chang Ping Rd., Sec., 1, Taichung, Taiwan

[21] Appl. No.: 09/264,889

[22] Filed: Mar. 9, 1999

[51] Int. Cl.[7] ................................................ F16L 37/28
[52] U.S. Cl. .............................. 137/614.04; 137/614.02; 285/320
[58] Field of Search ........................ 137/614.02, 614.04, 137/614.06; 251/149.6; 285/320

[56] References Cited

U.S. PATENT DOCUMENTS

| | | | |
|---|---|---|---|
| 404,786 | 6/1889 | Hanson | 137/614.04 |
| 2,770,256 | 11/1956 | Krapp | 137/614.06 |
| 3,687,161 | 8/1972 | Grguric et al. | 137/614.02 X |

Primary Examiner—Kevin Lee

[57] ABSTRACT

An auto-separating two-way check valve comprises a male and female joints wherein male joint comprises a left first retainer, a right first retainer, a first cavity between left first and right first retainers, a first flange, a first recess, and a first disk; a female joint having a second cavity, an inner flange, a second disk movable in second cavity, a left second retainer, a right second retainer, a first cavity between left second and right second retainers, a second flange, a second recess, and a second disk; a first pipe having holes on one open end and a first cap on the other end extended to the female joint; a second pipe having holes on one open end and a second cap on the other end received in the female joint; and springs wherein male joint connects to an open end of first pipe, female joint connects to an open end of second pipe, first disk is biased between first and second springs and received in first recess, and first pipe is through first recess to engage with second pipe; and second disk is biased between third and fourth springs and received in second recess, and second pipe is through second recess. This can prevent oil leak.

4 Claims, 4 Drawing Sheets

QUICK UNIVERSAL JOINT OF AUTO-SEPARATING TWO-WAY CHECK VALVE

FIELD OF THE INVENTION

The present invention relates to a hose joint and more particularly to a quick universal joint of auto-separating two-way check valve for carrying out a fast safe connecting a two-way-sealing oil tank to the open end of pump hose.

BACKGROUND OF THE INVENTION

For gas station, pump hoses are employed to convey oil to/from oil tanks. Such tanks are generally equipped with an oil input unit and an oil output unit in the inlet and outlet respectively. Each of units is further attached to a joint wherein a lever hinged to a flange on the joint is pressed down to secure the joint to the pump hose and the tank inlet/outlet respectively prior to pumping oil. However, after oil pumping complete an operator has to wait until the remained oil drains out of the pump hose and/or two-way valve prior to retracting a conventional pump hose equipped with two-way valve into place. Otherwise, the remained oil may leak from pump hose due to negligence. This is very dangerous. Further, there is no releasing unit provided in the connector of conventional joint and thus a high heat may be generated in the connector when pump hose is pulled by a strong force which in turn causes danger.

SUMMARY OF THE INVENTION

It is an object of the present invention to provide a quick universal joint of auto-separating two-way check valve comprising a male joint having a left first retainer, a right first retainer, a first cavity between the left first and right first retainers, a first flange, a first recess, and a first disk provided in the male joint; a female joint having a second cavity, an inner flange, a second disk movable in the second cavity, a left second retainer, a right second retainer, a first cavity between the left second and right second retainers, a second flange, a second recess, and a second disk; a first pipe having a plurality of holes on one open end and a first cap on the other end extended to the female joint; a second pipe having a plurality of holes on one open end and a second cap on the other end received in the female joint; a first, second, third, and fourth springs wherein the male joint connects to an open end of the first pipe, the female joint connects to an open end of the second pipe, the first disk is biased between the first and second springs and received in the first recess, and the first pipe is penetrated through the first recess to engage with the second pipe; and the second disk is biased between the third and fourth springs and received in the second recess, and the second pipe is penetrated through the second recess. By utilizing this, the oil pumping speed will be increased, while enhancing the operation safety.

It is another object of the present invention to provide a quick universal joint of auto-separating two-way check valve for preventing oil leak from the oil pipe when male joint and female joint are separated, thereby achieving a two-way checking effect.

It is further object of the present invention to provide a quick universal joint of auto-separating two-way check valve wherein the check valve is capable of separating automatically in case that the locking arm is unlocked and thus preventing spark being generated when pulling.

It is still further object of the present invention to provide a quick universal joint of auto-separating two-way check valve wherein the male joint and female joint are secured together by steel balls provided therebetween such that the oil hose can rotate freely while pumping oil.

The above and other objects, features and advantages of the present invention will become apparent from the following detailed description taken with the accompanying drawings.

DETAILED DESCRIPTION OF THE PREFERRED EMBODIMENTS

Figure 1:
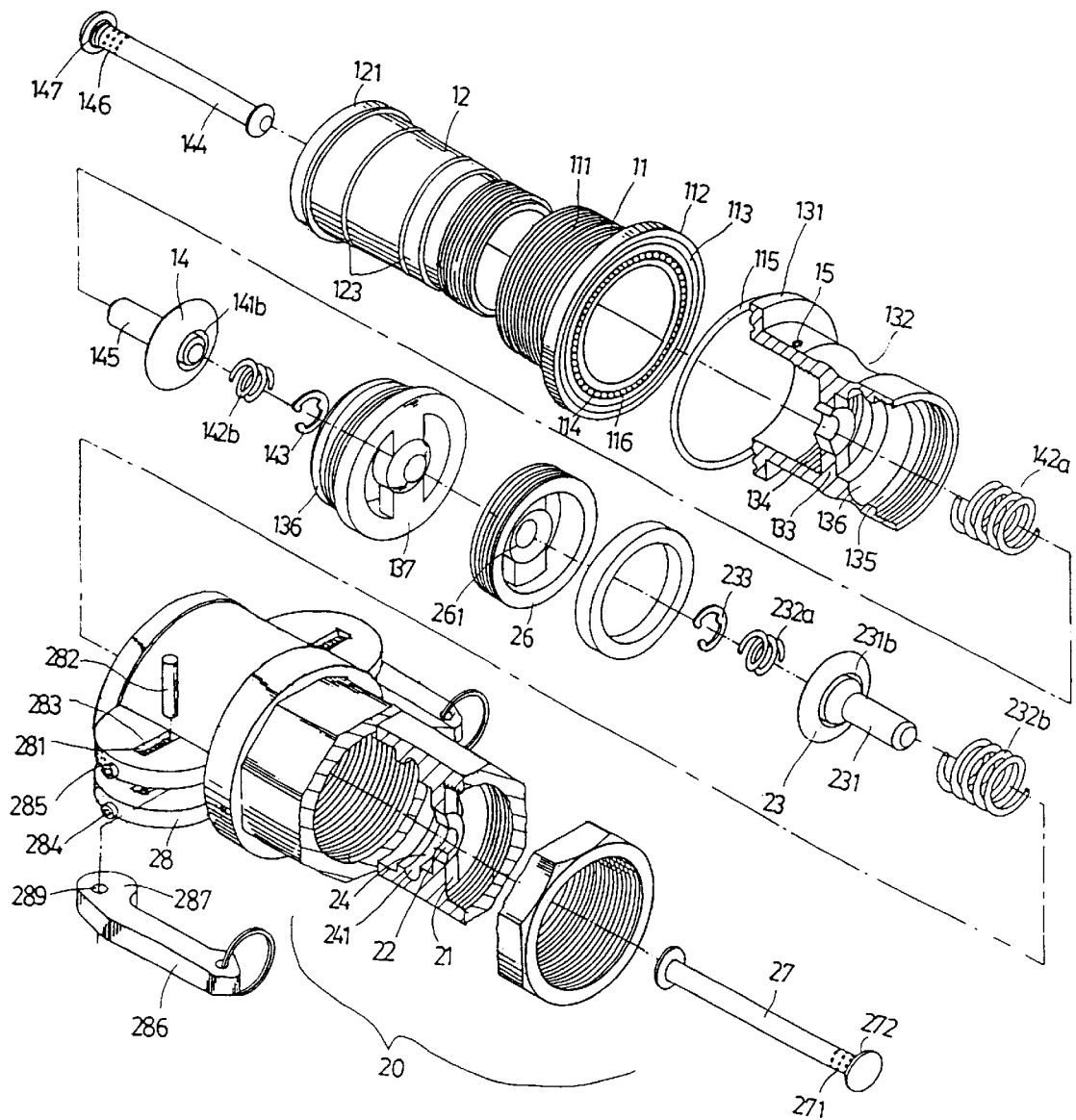
FIG. 1 is an exploded view of a quick universal joint of auto-separating two-way check valve of the invention with certain components in section.

As shown in FIG. 1, the quick universal joint of auto-separating two-way check valve of the present invention comprises a cylindrical male joint 10 and female joint 20. The male joint 10 comprises a metal left joint portion 11, a metal connecting pipe 12, and a metal right joint portion 13. The left joint portion 11 comprises a sleeve 111 with an end flange 112. The sleeve 111 has a predetermined length and a circular shape in cross-section. The outer surface of sleeve 111 is threaded for allowing it to threadedly secure to pump hose. A first circular groove 113 and a second circular groove 114 are provided on the surface of end flange 112 wherein a dust proof ring 115 is mounted in the first circular groove 113 and a steel ball ring 116 is mounted in the second circular groove 114.

The connecting pipe 12 has a predetermined length with an extended circular retainer 121 formed in one end, threads 122 formed on the outer surface on the other end, and a number of leak proof rings 123 formed on the outer surface for preventing oil leak.

Right joint portion 13 has a body with a left end flange 131 corresponding to the end flange 112 of the left joint portion 11. A recessed coupling ring 132 is formed on a suitable position of the right joint portion 13. A retainer 133 is provided inside the right joint portion 13. The retainer 133 connects with the inner wall of right joint portion 13 in the upper and lower parts thereof and thus leaving a radial hollow portion. Screw hole 134 and cavity 135 are provided in the front and rear of retainer 133 respectively. A flange 136 is provided in the cavity 135. A movable retainer 137 is threadedly secured to the right end in the cavity 135. A movable disk 14 is provided in the cavity 135. The central portion of movable disk 14 is thicker than the edge. A circular groove 141a is provided in the left side the disk 14 for receiving the right side of first spring 142a. The left side of first spring 142a engages against the retainer 133 of right joint portion 13. A sleeve 145 is protruded from the central portion of left side of the disk 14. A circular groove 141b is provided in the right side the disk 14 for receiving the left side of second spring 142a. The right side of second spring 142b engages against a C-shaped retaining ring 143 put on a pipe 144. The pipe 144 is inserted through sleeve 145 of movable disk 14 and the hole of movable retainer 137. A number of holes 146 are provided in the left end portion of the pipe 144. A cap 147 is provided in the left end of pipe 144. The shapes of left and right ends of pipe 144 conform to the central portions of retainer 133 and movable retainer 137 wherein the left end of the pipe 144 is sealed by the cap 147, while the right end thereof is open. A pin 15 threadedly secures right joint portion 13 and connecting pipe 12 together.

The female joint 20 is a pipe member having the left end engaged with right end of right joint portion 13 of male joint 10. Inside the female joint 20 has a right retainer 21 with a central hole 22 for passing through a pipe 231 of disk 23. The disk 23 is provided in a cavity 24. A flange 241 is provided in cavity 24. A ring 25 is provided in the left in the cavity 24. To the left of ring 25 is a left retainer 26 which is threadedly secured to the bore of the left part of female joint 20. Only the top and bottom portions of the left retainer 26 threadedly secure to the female joint 20 and thus leaving a radial hollow portion in the retainer 26. The right retainer 21 is like left retainer 26 and thus allowing oil to pass through. A disk 23 is provided in the cavity 24 between left retainer 26 and right retainer 21. Two circular grooves 231a, 231b are formed on two opposite sides of the disk 23 for engaging against the right end of spring 232a and the left side of spring 232b respectively. The left end of spring 232a engages against a retaining ring 233 which is put on a pipe 27. The pipe 27 is inserted through hole 261 of left retainer 26 and sleeve 231 of disk 23. A number of holes 271 are provided in the right end portion of the pipe 27. A sealing cap 272 is provided in the right end of pipe 27, while the left end of pipe 27 is open. The pipe 27 is provided correspondingly to the pipe 144 in the male joint 10.

Moreover, a pair of opposite lugs 28 are provided on female joint 20. An opening 281 is formed in each of lugs 28 for permitting a pin 282 to insert through. A spring 283 is provided in the opening 281. A bolt 284 is threaded into the hole 285 above the opening 281 such that bottom end of spring 283 is engaged with pin 282, while the top end of spring 283 is engaged with bolt 284 for anchoring the spring 283. Pin 282 further passes through lug 28 to receive within a hole 289 of eccentric member 287 of locking arm 286 to form a safety mechanism.

Figure 2:
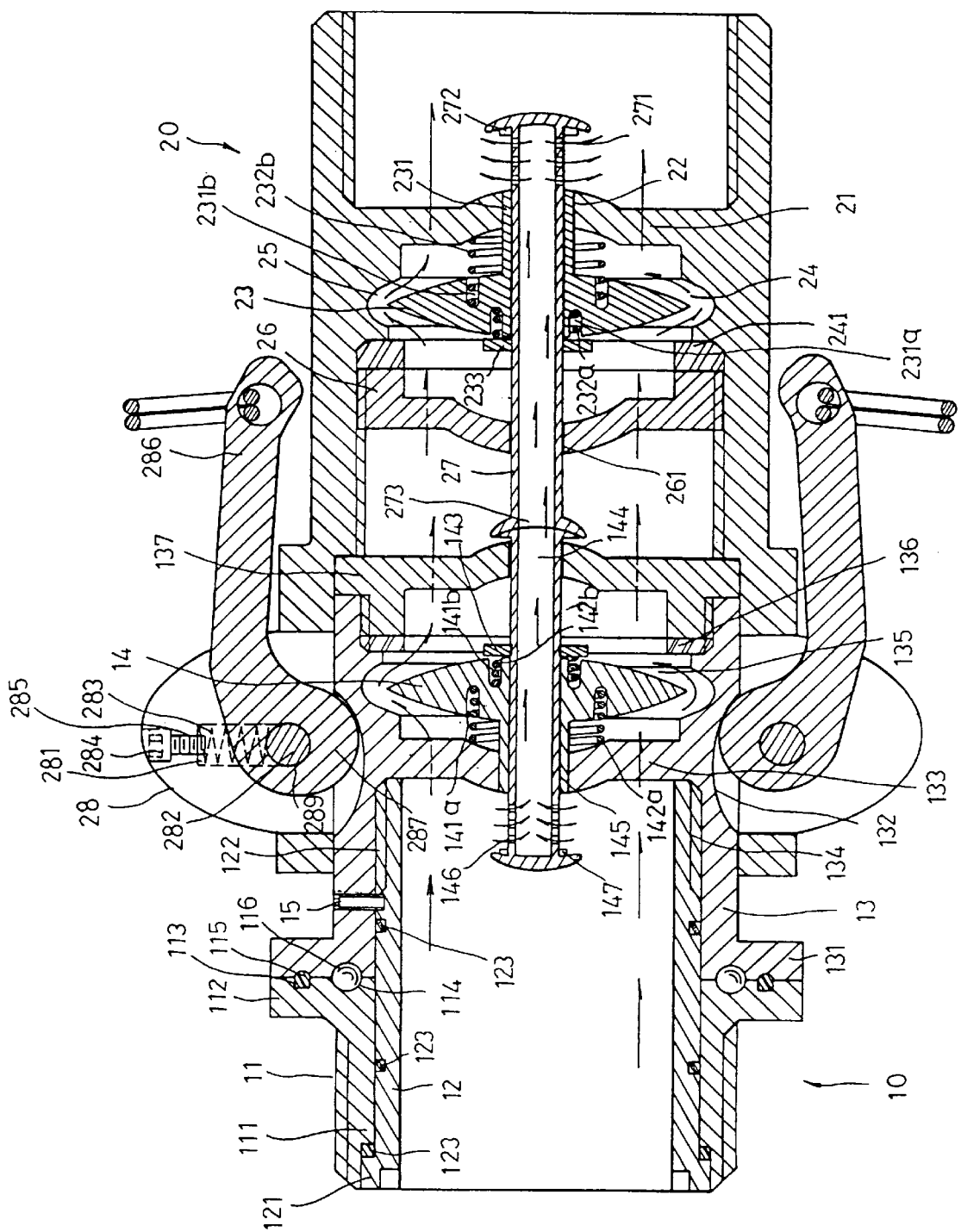
FIG. 2 is a cross-sectional view of FIG. 1.

The assembly process is shown in FIG. 2. First, insert connecting pipe 12 into the left side of left joint portion 11 to screw the threads 122 of connecting pipe 12 into the screwed hole of right joint portion 13. Since flange 112 provided to the left of connecting pipe 12 engages against the inner circumference of left joint portion 11 and thus right joint portion 13 is forced to engage with left joint portion 11 when connecting pipe 12 is screwed. Then put steel balls 116 in the second circular groove 114 of left joint portion 11 and put dust proof ring 115 in the first circular groove 113. Then connect left joint portion 11 and right joint portion 13 together. Pin 15 threadedly secures left joint portion, right joint portion 13, and connecting pipe 12 together through a hole on the right joint portion 13. Next, put disk 14 in the right side of right joint portion 13 and spring 142a in the circular groove 141a of the disk 14. Insert sleeve 145 into retainer 133 within right joint portion 13. Insert pipe 144 into left side of right joint portion 13 to pass through the sleeve 145 of disk 14. Then put second spring 142b into the right side of disk 14. As such, one end of spring 142b is received in circular groove 141b and the other end is biased by a C-shaped retaining ring 143 on pipe 144. The disk 14 is received in cavity 135. The left side of disk 14 seals the right edge of flange 136 in the cavity 135. The right bore of pipe 144 is larger than the outer diameter of pipe 144. The right open end is an outward arcuate shape formed by soldering. Furthermore, the right open end of right joint portion 13 is closed by retainer 137. A hole on the retainer 137 is provided to allow a fastener to attach to the pipe 144.

Put spring 232b on the pipe 231. Then put pipe 231 of disk 23 through central hole 22 of right retainer 21. Put one end of spring 232b into circular groove 231b of disk 23. Put spring 232a into circular groove 231a of disk 23. Put pipe 27 into the sleeve 231 from right to left to pass through sleeve 231 of disk 23, a retaining ring 233, and the central hole of sealing cap 272 on the left side of female joint 20, to the hole 261 of left retainer 26. Tube 27 has a flare shape in the open end being soldered after assembled. The open end conforms to the right end of pipe 144 of male joint 10. The circumference of the disk 23 is received in the flange 241 in the cavity 24 for sealing flange 241 from outside.

Figure 3:
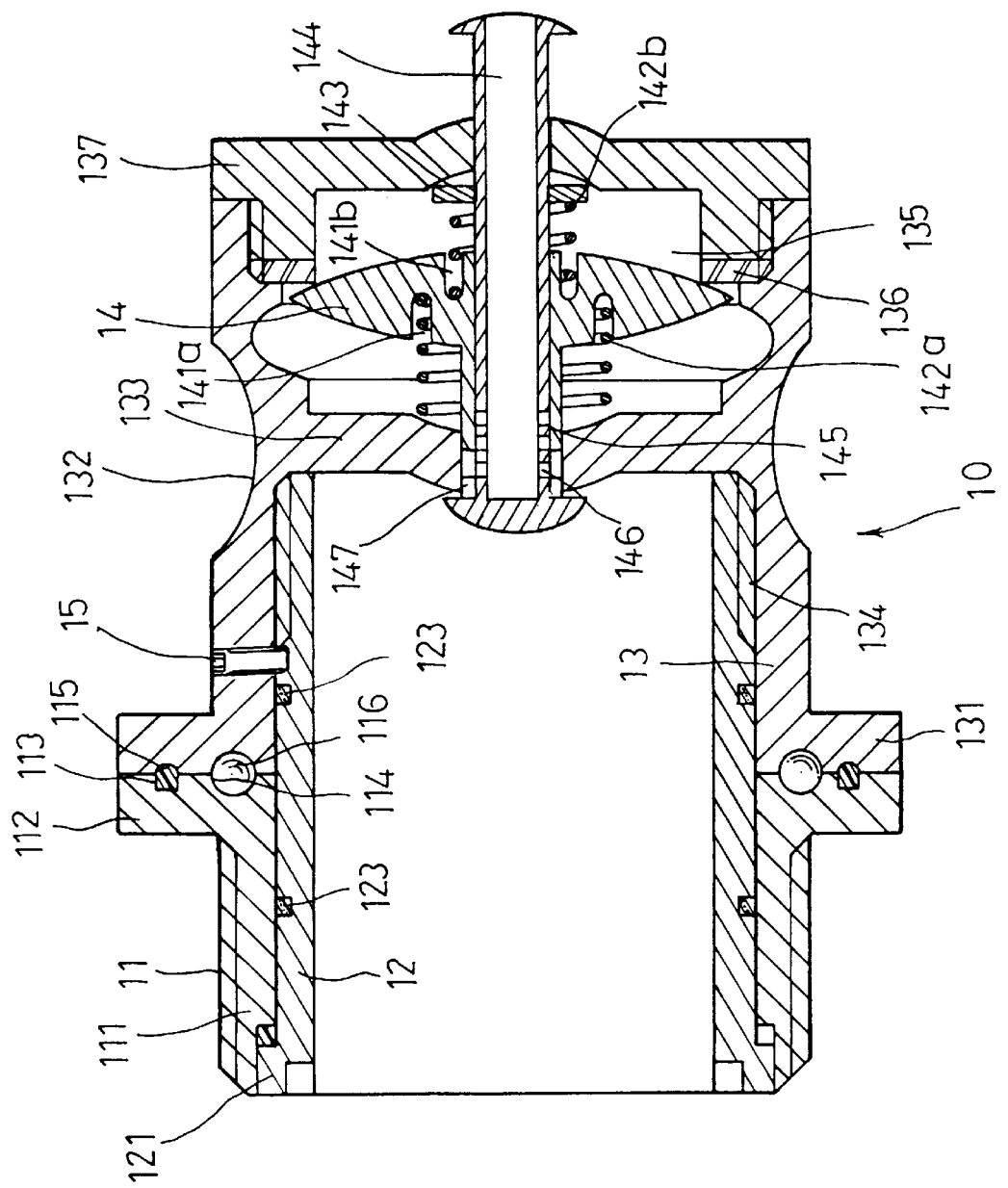
FIG. 3 is a greatly enlarged fragmentary view of the male joint shown in FIG. 2.
Figure 4:
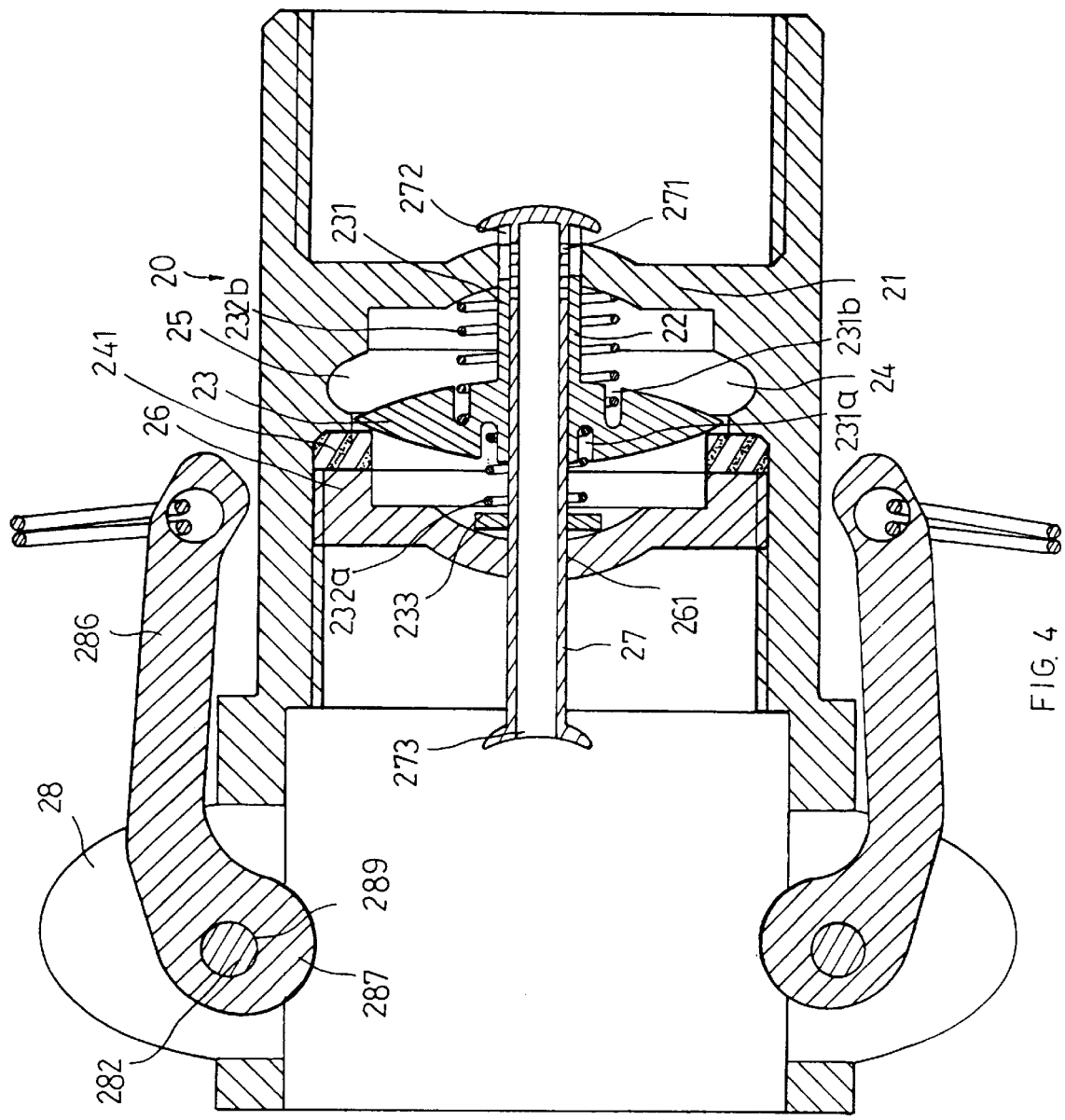
FIG. 4 is a greatly enlarged fragmentary view of the female joint shown in FIG. 2.

FIGS. 3–4 illustrates the operation of the invention. Before connecting male joint 10 to female joint 20, disk 14 is pushed to the right by the biased first spring 142a and second spring 142b. At this time the peripheral surface of flange 136 in the cavity 135 will be sealed by the outer circumference of disk 14. As such, oil in the pump hose connected to male joint 10 will not flow to female joint 20 through here. The holes 146 at the left end of pipe 144, under the biased force of first spring 142a and second spring 142b, will be pushed to the right and accordingly holes 146 is received in retainer 133 and sealed tightly by cap 147 of pipe 144. As a result, even if there is oil in connecting pipe 12, oil may not flow into pipe 144, i.e. it would not overflow. Similarly, before female joint 20 is connected to male joint 10, oil will not flow from the left open end to the male joint 10. This is because springs 232a, 232b bias on disk 23 to engage against flange 241 such that oil in female joint 20 is blocked to flow to male joint 10. Additionally, the pipe 27 of female joint 20 is pushed to the left by springs 232a, 232b. Accordingly the holes 271 at the right end of pipe 27 are drawn back to receive in the central hole 22 of the right retainer 21 of female joint 20 to be sealed by sealing cap 272. Thus oil will not flow from the left side of female joint 20 into pipe 27.

Once male joint 10 and female joint 20 are secured, particularly after upper and lower locking arms 286 of female joint 20 are pulled down, the protrusion of eccentric member 287 will engage against the connecting ring 16 of male joint 10 to carry out a quick connection and fast locking. Meanwhile the right open end of pipe 144 of male joint 10 will engage against pipe 27 of female joint 20 for being pushed outwardly. Such push force will further push C-shaped retaining ring 143 to press the second spring 142b to bias toward the direction of disk 14 to move dish 14 to the left. Thus the disk 14 will separate from the right circumferential wall of flange 136 leaving a gap between them. Meanwhile pipe 27 of female joint 20 will also move to the right to cause the holes 271 at the right side of pipe 27 to clear from the central hole 22 of right retainer 21. Then disk 23 will also be pushed to leave a gap between it and the flange 241 in the cavity 24. Similarly, the left holes 146 of pipe 144 of male joint 10 will be received in the connecting pipe 12 and thus oil in connecting pipe 12 will flow through holes 146 of pipe 144 toward the holes 271 of pipe 27 of female joint 20. Eventually, flow into the oil tank (not shown). It is important to note that much and fast oil will pass through retainer 133 of right joint portion 13, the cavity 135, flange 136, retainer 137, left retainer 26 of female joint 20, flange 241 between cavity 24 and disk 23, right retainer 21, the screwed holes at the right end of female joint 20, and finally to the oil tank.

Another aspect of the invention is that the firm connection of male joint 10 and female joint is achieved by pressing down the locking arms 286 to have eccentric members 287 to press on the concave portion of the connecting ring 16 of male joint 10. In case that operator forgets to pull up the locking arms 286 to separate male joint 10 from female joint 20 there is also a technique to ensure no oil leak as detailed below.

Pull female joint 20 strongly, the eccentric member 287 of lock arm 286 would be pressed fast upward and downward respectively by the bias force of spring 283 to make the spring 283 draw back. As such, locking arm 286 would slip off laterally from connecting ring 16 of male joint 10 and thus male joint 10 could separate from female joint 20. As a result, a possible danger is avoided.

It is unavoidable to shift the direction of pump hose when a long pump hose is carried to prepare pumping by connecting one end of hose to male joint 10. However, by utilizing the invention this problem is solved. In detail, by utilizing the steel balls 116 provided between left joint portion 11 and right joint portion 13, no matter what direction the pump hose may be, it is easy to do the oil pumping, thereby avoiding any potential danger.

It is important to note that all operations of the invention are automatic. In other words, it is done by the compression and expansion of spring and thus having a smooth operation.

While the invention herein disclosed has been described by means of specific embodiments, numerous modifications and variations could be made thereto by those skilled in the art without departing from the scope of the invention set forth in the claims.

I claim:

1. A quick universal joint of auto-separating two-way check valve, comprising:

a male joint having a left first retainer, a right first retainer, a first cavity between the left first and right first retainers, a first flange, a first recess, and a first disk;

a female joint having a second cavity, an inner flange, a second disk movable in the second cavity, a left second retainer, a right second retainer, a first cavity between the left second and right second retainers, a second flange, a second recess, and a second disk;

a first pipe having a plurality of holes on one open end and a first cap on the other end extended to the female joint;

a second pipe having a plurality of holes on one open end and a second cap on the other end received in the female joint; and a first, second, third, and fourth springs;

wherein the male joint connects to an open end of the first pipe, the female joint connects to an open end of the second pipe, the first disk is biased between the first and second springs and received in the first recess, and the first pipe is penetrated through the first recess to engage with the second pipe; and the second disk is biased between the third and fourth springs and received in the second recess, and the second pipe is penetrated through the second recess.

2. The two-way check valve as recited in claim 1, further comprising a pair of opposite lugs on the female joint wherein an opening is formed in each of the lugs for permitting a pin to insert through, a fifth spring is provided in the opening, a bolt is threaded into a hole above the opening, a bottom end of the spring is engaged with the pin, a top end of the spring is engaged with the bolt for anchoring the spring, and the pin passes through one of the lugs to receive within a hole of an eccentric member of a locking arm.

3. The two-way check valve as recited in claim 1, wherein the male joint comprises a left joint portion, a connecting pipe, and a right joint portion being secured by a fastener.

4. The two-way check valve as recited in claim 3, further comprising a plurality of steel balls and a dust proof ring provided between a connection surface of the left joint portion and the right joint portion for allowing the left joint portion and the right joint portion to rotate freely.

* * * * *